United States Patent [19]

Nordengren

[11] 4,080,298

[45] Mar. 21, 1978

[54] ARRANGEMENT IN FILTERS OF THE ENDLESS-BELT TYPE HAVING A LONGITUDINALLY EXTENDING VACUUM-SUCTION BOX ARRANGED BENEATH THE ROTATING BELT

[75] Inventor: Rolf Gunnar Jonas Nordengren, Landskrona, Sweden

[73] Assignee: Nordengren Patenter AB, Landskrona, Sweden

[21] Appl. No.: 723,261

[22] Filed: Sep. 14, 1976

[30] Foreign Application Priority Data

Sep. 16, 1975 Sweden .............................. 7510315

[51] Int. Cl.² .............................................. B01D 33/14
[52] U.S. Cl. ..................................... 210/400; 210/406
[58] Field of Search ....................... 210/409, 401, 406; 209/307; 162/348

[56] References Cited

U.S. PATENT DOCUMENTS

3,992,298  11/1976  Davis .............................. 210/401 X

FOREIGN PATENT DOCUMENTS

2,324,056  11/1974  Netherlands ......................... 210/400

Primary Examiner—William A. Cuchlinski, Jr.
Attorney, Agent, or Firm—Fred Philpitt

[57] ABSTRACT

An arrangement in endless-belt type filters having longitudinally extending vacuum suction boxes arranged beneath the rotating belt, said suction box having the form of a channel provided with side walls a surface of the upper edge of each of which abuts sealingly, during operation of the filter, with the undersurface of the rotating belt, so as, through perforations in the belt, to cause transportation of liquid from a solid material on the upper surface of a filter cloth lying on the belt to the suction box under the influence of the vacuum, the rotating belt being supported by support bars on either side of the suction box, the arrangement being characterized in that, to enable the suction box to be inspected and cleaned, said box is removeably arranged on a pivotable arm by means of which the box can be swung away from the position in which a surface on the upper edges of the channel sealingly abut, during operation of the filter, the upper surface of the rotating belt, to a further position in which the box can be inspected and cleaned; and in that the pivotable arm and/or one of the support bars is provided with co-operating stop means for, when the suction box is returned from the further position, to adjust the surfaces sealing against the rotating belt during its operation mutually on the same level so as to ensure a satisfactory seal between said surfaces and said belt.

3 Claims, 1 Drawing Figure

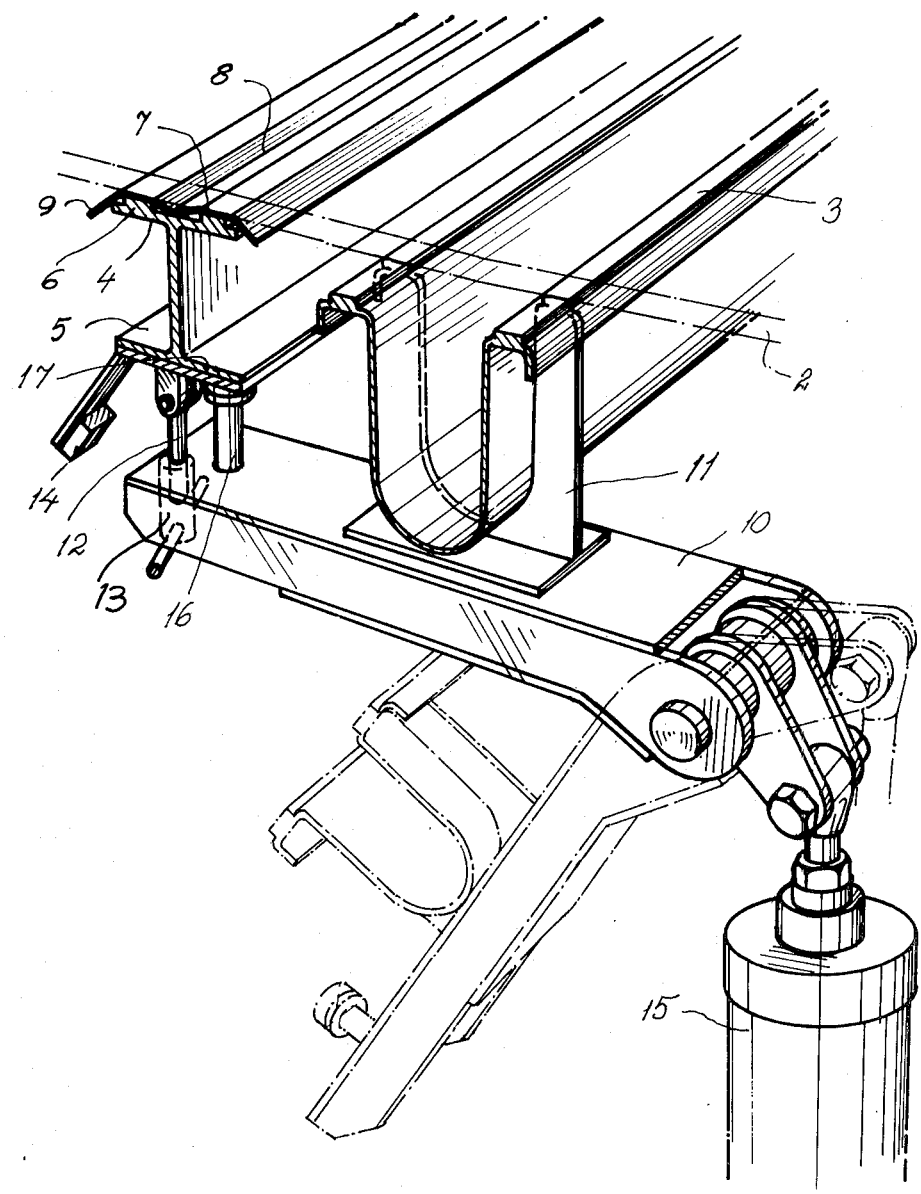

ARRANGEMENT IN FILTERS OF THE ENDLESS-BELT TYPE HAVING A LONGITUDINALLY EXTENDING VACUUM-SUCTION BOX ARRANGED BENEATH THE ROTATING BELT

The present invention relates to an arrangement in filters of the endless-belt type having a longitudinally extending vacuum-suction box arranged beneath the rotating belt.

In heavy industry, it is often required to recover a certain product or substance by filtering operations. One example of this is found in the manufacture of phosphoric acid, in which minerals rich in phosphorous, such as apa-tite, are reacted with a mineral acid, such as sulphuric acid. Such a reaction results in a mixture containing calcium sulphate (gypsum) and phosphoric acid. The resulting acid is normally separated from the calcium sulphate formed by means of an endless-belt type filter. Such a filter comprises a frame which carries the essential components of the assembly, these components comprising a rotatable belt, which is normally made of vulcanised rubber or some similar substance, and a filter cloth arranged to be brought into contact with the belt during part of its rotation during which the reaction mixture containing the liquid substance which is to be recovered, for example phosphoric acid, is applied to the upper surface of the filter cloth, whereupon the liquid material is caused to pass through openings in the filter cloth and the solid material is retained on the upper surface thereof.

In the following, the background of the invention will be described with reference to a filter particularly intended for the manufacture of phosphoric acid, by way of a typical example. In this particular case, the filter assembly comprises an endless belt made preferably of reinforced rubber or similar material. The belt is provided with transverse ribs and is mounted and arranged so as to move between two terminal rollers. The tension required in the belt during operation of the filter is created by means of these two rollers. The belt exhibits longitudinally extending edge portions with a ridge in each and every one of said portions. The vertical extension of the ridges is such that the shallow, groove-like space defined by the ribbed upper surface of the belt and the ridges is able to receive a filter cake having a thickness of up to about 100 mm, the thickness being uniformly distributed over the whole of the groove-like space. The ribbed belt is perforated along an imaginary line which extends centrally of the belt parallel with its longitudinal axis. The filter cloth rests against the ribs of the ribbed belt along the filtering zone of the filter assembly. During that phase of the movement of the rotating belt in which the belt returns, the filter cloth is completely separated from the belt. Cleaning of the belt and the filter cloth, by spraying water thereon, is simplified in this way. During the phase of belt movement in which the cloth rests on the ribbed upper surface of the belt, the under surface of the belt is in sealing contact with a plurality of suction boxes which communicate with a source of vacuum. Liquid intended for recovery and washing liquid in other zones passes to the suction boxes and to a collection vessel through the openings under the influence of the vacuum.

The belt is made of rubber and is reinforced with a cord made, for example, of Terylene ®. The incorporation of this reinforcement has enabled filters with extremely large filter surfaces to be constructed.

With an endless-type filter belt, transportation of the rotating belt during that portion of its movement when filtering and, preferably also washing or solid material is carried out presents a problem. To solve this problem, there are used supporting bars against which the upper surface of the belt is caused to slide whilst supplying a lubricant, normally water, to form a friction-reducing film between the belt and the slide surface of the supporting bar. In order that the filter is able to operate satisfactorily and to enable faults to be rectified, the interior of the vacuum-suction box must be accessible for inspection and cleaning and, at the same time, subsequent to carrying out such inspection or cleaning, it must be possible to be able to return the box to a position in which the surfaces thereof for contact with the rotating belt are located on exactly the same level with regard to the desire to provide as good a seal as possible between the belt and the contacting surfaces, and on a level which is located at some millimetres beneath the surface of the support bar with which the belt is in sliding contact during operation of the filter.

The present invention relates to an arrangement in an endless-belt type filter having a longitudinally extending vacuum box arranged beneath the rotating belt, said box having the form of a channel with side walls one surface of the upper edges of each of which sealingly abut, during operation of the filter, the undersurface of the rotating belt so as to cause transportation of liquid, through perforations in the belt, from a solid material on the upper surface of a filter cloth arranged on the belt to the suction box under the influence of the vacuum, and in which the rotating belt is supported by support bars on either side of the suction box.

For the purpose of permitting the suction box to be inspected and cleaned, the invention is characterised in that said box is removably arranged on a pivotable arm such that, with the aid of said arm, it can be pivoted away from the position in which, during operation of the filter, the upper edges of the channel-like structure sealingly abut the under surface of the upper part of the rotating belt through one surface of said upper edges, to a further position in which the box can be inspected and cleaned; and in that the pivotable arm and one of the support bars are provided with co-operating stop means arranged, when returning said box from said further position, to adjust the surfaces sealing against the rotating belt during operation of the filter mutually at the same level so as to ensure a satisfactory seal between the surfaces and said belt.

The accompanying drawing shows a perspective view of an arrangement according to the invention.

In the drawing there is shown a vacuum suction box 1 arranged beneath the rotating belt 2 (the latter being indicated in chain lines) in an endless-belt type filter. The suction box extends parallel with the longitudinal direction of the belt and has the form of a channel the cross-sectional shape of which is in the form of a U. The upper edge of each leg of the U has a longitudinally extending ridge 3 exhibiting a flat apex surface, which is intended to abut sealingly against the under surface of the belt. On either side of the suction box 1 there is arranged a support bar in the form of an I-beam arranged in a frame supporting the major components of the filter. Only one support bar is shown in the drawing. The I-beam has an upper planar portion 4 and a lower planar portion 5 which are mutually joined by an intermediate member. The upper side of the upper portion has two longitudinally extending ridges 6, 7 with planar apex surfaces. A support plate 8, which is folded to conform to the two apex surfaces and to form a conductor 9 at the sides and, further, in the centre is bent to a shallow channel-shape with inclined surfaces, covers the upper surface of the upper portion of the I-beam to form a glide and support surface for the filter belt. Opening into the shallow channel is a conduit for supplying water for lubricating the belt. The water is conducted to channels (not shown) at the side of the cover plate via the conducting surfaces 9.

To enable the vacuum suction box 1 to be inspected and cleaned, said box is arranged on a pivotable arm 10 which is moveable between two positions, of which the first is shown in full line and the second in chain lines. The box 1 is mounted on the pivotable arm by means of a holder, the base of which is attached to the arm. The box is held in place in the position by means of a bolt 12 fastened to the under side of the support bar. The bolt 12 cooperates with a nut 13 which can be rotated from the underside of arm 10 by means of opposing pins to a position in which the pivotable arm holds the suction box in a position where it is in contact with the undersurface of the rotating belt and to a further position where both the nut 13 and the bolt 12 by a recess (not shown) in one end of the pivotable arm and by means of a further bolt can be pivoted against a magnet 14 in which nut position the pivotable arm can swing to the chain lines by means of an arrangement having a working piston 15 actuated by pressure medium.

With respect to the operation of the filter it is very important that a good seal is obtained between the under surface of the belt and the co-operating abutment surfaces of the suction box during sliding movement of the belt over the support bars and the vacuum box. These abutment surfaces lie on a level located some millimetres beneath the level on which the slide surfaces of the cover plate 8 are located—this so that the belt, during its movement, is held properly tensioned, even over its width, such tensioning being a prerequisite for the good operation of the filter. The tension force is produced by suction from the suction box in a manner such that the belt is in abutment also with the apex surface of the ridges. In this respect, it is important for obtaining a good seal through abutment of the belt with the ridges 3 that said ridges are located on exactly the same level. It has been found extremely difficult to return the suction box, subsequent to carrying out an inspection thereon or cleaning the same, to a position in which the ridges 3 are located at exactly the same level. To this end, there are arranged two mutually co-operating members, of which one, 16, is mounted on the pivotable arm 10, and the other 17, is mounted on the lower planar portion 5 of the support bar. Both members are adjusted in a manner such that, in the contact position, the ridges 3 and 4 are located on exactly the same level, some millimetres beneath the level of the slide surfaces of the cover plate 8.

What is claimed is:

1. An arrangement for endless-belt type filters having longitudinally extending vacuum suction boxes arranged beneath a rotating belt, each suction box being in the form of a channel provided with side walls, a surface of the upper edge of each suction box abutting sealingly with the undersurface of the rotating belt during operation of the filter so as to cause movement of liquid from a material on the upper surface of a filter cloth lying on the belt to the suction box under the influence of the vacuum through perforations in the belt, the rotating belt being supported by support bars on either side of the suction box, said suction box being mounted on a pivotable arm so that the suction box can be swung away from a first position in which a surface on the upper edges of the channel sealingly abut the undersurface of the upper part of the rotating belt, during operation of the filter, to a second position in which the suction box can be inspected and cleaned, said pivotable arm and/or one of the support bars being provided with cocoperating stop means for adjusting said surfaces of said suction box sealing against the rotating belt when the suction box is returned to said first position so as to ensure a satisfactory seal between said surfaces and said belt during the operation of the belt.

2. An arrangement according to claim 1 which additionally includes a bolt-nut joint for removably connecting the pivotable arm to one of the support bars.

3. An arrangement according to claim 2 wherein the bolt is pivotable via a recess in the support bar towards a magnet which holds the bolt during inspection and cleaning of the interior of the suction box.

* * * * *